United States Patent
Roy et al.

(10) Patent No.: US 8,018,894 B2
(45) Date of Patent: Sep. 13, 2011

(54) METHOD AND APPARATUS FOR IMPLEMENTING A BLIND SEAMLESS CHANNEL CHANGE

(75) Inventors: Vincent Roy, Montreal (CA); Angelo A. Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 1081 days.

(21) Appl. No.: 11/536,273

(22) Filed: Sep. 28, 2006

(65) Prior Publication Data

US 2007/0076596 A1 Apr. 5, 2007

Related U.S. Application Data

(60) Provisional application No. 60/722,104, filed on Sep. 30, 2005.

(51) Int. Cl.
*H04W 4/00* (2009.01)
(52) U.S. Cl. ........... 370/329; 455/62; 455/63.1; 455/39; 455/61; 370/229; 370/341; 370/228; 370/338
(58) Field of Classification Search .................... 455/62, 455/63.1, 39, 61; 370/228, 229, 338, 341
See application file for complete search history.

(56) References Cited

U.S. PATENT DOCUMENTS

| | | | |
|---|---|---|---|
| 6,370,381 B1 * | 4/2002 | Minnick et al. ............... | 455/445 |
| 7,206,840 B2 * | 4/2007 | Choi et al. .................... | 709/225 |
| 7,231,215 B2 * | 6/2007 | Lewis et al. ................... | 455/450 |
| 2002/0181417 A1 * | 12/2002 | Malhotra et al. .............. | 370/329 |
| 2003/0171116 A1 * | 9/2003 | Soomro ........................ | 455/434 |
| 2004/0146022 A1 | 7/2004 | Lewis et al. | |
| 2004/0156336 A1 * | 8/2004 | McFarland et al. ........... | 370/329 |
| 2004/0185861 A1 * | 9/2004 | Domon et al. ................ | 455/450 |
| 2005/0128982 A1 | 6/2005 | Kitchin | |
| 2005/0250507 A1 * | 11/2005 | Leung et al. ................. | 455/452.1 |
| 2006/0223541 A1 * | 10/2006 | Famolari ....................... | 455/450 |

FOREIGN PATENT DOCUMENTS

WO 03/075513 9/2003

OTHER PUBLICATIONS

IEEE, *IEEE P802.11v/D0.02 Draft Amendment To Standard For Information Technology—Telecommunications And Information Exchange Between Systems—LAN/MAN Specific Requirements—Part 11: Wireless Medium Access Control (MAC) And Physical Layer (PHY) Specifications, Amendment V: Wireless Network Management*, IEEE P802.11v/D0.02, (Mar. 2006).

* cited by examiner

*Primary Examiner* — Kamran Afshar
*Assistant Examiner* — Khalid Shaheed
(74) *Attorney, Agent, or Firm* — Volpe and Koenig, P.C.

(57) ABSTRACT

A method and apparatus for implementing a blind seamless channel change (BSCC) when at least one of a plurality of wireless communication devices is jammed on a current communication channel includes the first wireless communication device transmitting a BSCC message on the current communication channel to a second wireless communication device that includes information relating to a communication channel selected from a plurality of available communication channels that the first wireless communication device is switching to next, and a time period when the first wireless communication device will be transmitting on the selected communication channel. The first wireless communication device switches to the selected communication channel. The second wireless communication device receives the BSCC message and switches to the selected communication channel. The first and second wireless communication devices resume normal wireless communication.

24 Claims, 7 Drawing Sheets

METHOD AND APPARATUS FOR IMPLEMENTING A BLIND SEAMLESS CHANNEL CHANGE

CROSS REFERENCE TO RELATED APPLICATIONS

This application claims the benefit of U.S. Provisional Application No. 60/722,104, filed Sep. 30, 2005, which is incorporated by reference herein as if fully set forth.

FIELD OF INVENTION

The present invention relates to wireless communication systems such as wireless local area networks (WLANs) and the like. More particularly, the present invention relates to a method and apparatus for enabling at least two communicating devices to resume communication with one another after one or both experiences interference on a current communication channel.

BACKGROUND

Because WLAN systems typically operate in an unlicensed band, it is possible that non-WLAN devices may emit radio signals on the channel currently being used by an on-going WLAN radio connection between a pair of WLAN nodes, such as an access point (AP) communicating with a station (STA). When this interference prevents one or both WLAN receivers from correctly receiving any packets sent by their counterpart, the receivers are said to be "jammed," or "blind".

When the level of interference perceived by one or both members of a pair of WLAN nodes impairs the on-going radio-communication, the performance of a radio link established between the nodes may be improved if the communication channel of the radio link is changed to one that experiences a lower level of interference. The speed at which this channel change occurs may have a strong impact on the Quality of Service (QoS) perceived by end users of the communication channel. When the WLAN is used to provide services that require a particular QoS level, it is important for the two WLAN nodes to change the channel as quickly as possible such that the channel change is seamless for the end users.

Currently, there are several conventional mechanisms for performing a seamless channel change. One mechanism allows one WLAN node to convey to its counterpart that it is switching its communication channel. Another more sophisticated hand-shaking mechanism operates by having one node suggest, or request, a channel change and the other node accept or confirm the channel switch suggestion or request. However, such mechanisms require that each WLAN node be able to correctly receive and detect the signaling frame, or frames, sent by its counterpart on the interfered channel as the signaling frame(s) contain the information required to switch the channel. Unfortunately, if interference has jammed the receiver of at least one of two WLAN nodes involved in a radio communication, it is not possible for the two WLAN nodes to switch channels in a seamless manner.

Accordingly, it would be advantageous to provide a method and apparatus that allows jammed devices to blindly and seamlessly switch, or change, channels without the limitations of conventional mechanisms.

SUMMARY

The present invention is directed to a method and apparatus for implementing a blind seamless channel change (BSCC) when at least one of a plurality of wireless communication devices is jammed on a current communication channel. The method and apparatus include the first wireless communication device transmitting a BSCC message on the current communication channel to a second wireless communication device that includes information relating to a communication channel selected from a plurality of available communication channels that the first wireless communication device is switching to next, and a time period when the first wireless communication device will be transmitting on the selected communication channel. The first wireless communication device switches to the selected communication channel. The second wireless communication device receives the BSCC message and switches to the selected communication channel. The first and second wireless communication devices resume normal wireless communication.

BRIEF DESCRIPTION OF THE DRAWINGS

The foregoing summary, as well as the following detailed description of the preferred embodiments of the present invention will be better understood when read with reference to the appended drawings, wherein.

DETAILED DESCRIPTION OF THE PREFERRED EMBODIMENTS

Hereafter, a station (STA) or node includes but is not limited to a wireless transmit/receive unit (WTRU), a user equipment (UE), a mesh point (MP), a mobile station, a fixed or mobile subscriber unit, a pager, or any other type of device capable of operating in a wireless environment. When referred to hereafter, an access point (AP) includes but is not limited to a WTRU, an MP, a base station, a Node-B, a site controller, or any other type of interfacing device in a wireless environment.

Although embodiments of the present invention will be described in greater detail below, the present invention, in general, relates to a method and apparatus for implementing a blind seamless channel change (BSCC) when one or more wireless devices, such as an AP device or a STA device, experience jamming while communicating with one another. In general, at least one jammed device transmits a BSCC packet or message, to one or more other devices, informing them of a next available channel to change to, so that wireless communication can continue.

Figure 1:
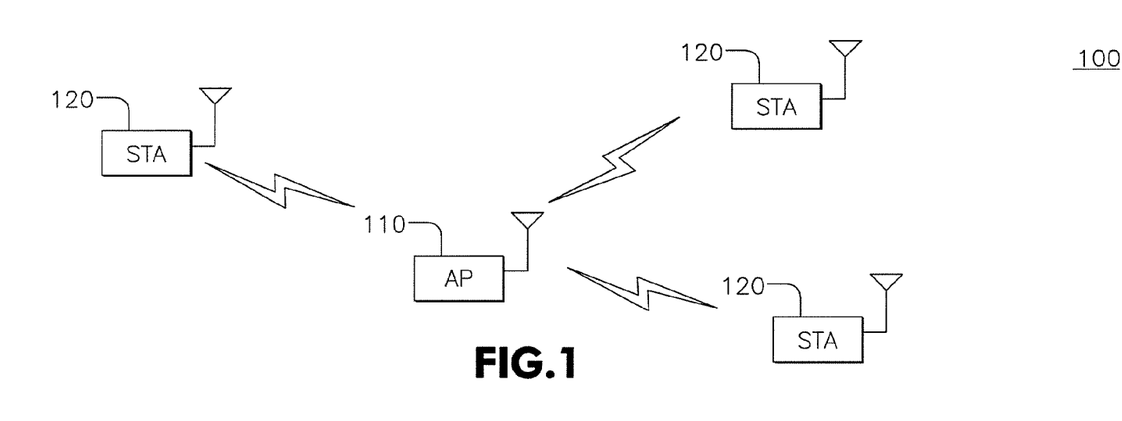
FIG. 1 shows an exemplary wireless communication system, including an access point (AP) and a plurality of stations (STAs), configured in accordance with the present invention.

FIG. 1 shows an exemplary wireless communication system 100 configured in accordance with the present invention. The wireless communication system 100 includes a plurality of wireless communication devices, such as an AP 110 and a plurality of STAs 120, capable of wirelessly communicating with one another. Although the wireless communication devices depicted in the wireless communication system 100 are shown as APs and STAs, it should be understood that any combination of wireless devices may comprise the wireless communication system 100. That is, the wireless communication system 100 may comprise any combination of APs, STAs, MPs, and the like.

For example, the wireless communication system 100 may include an AP and client device operating in an infrastructure mode, STAs operating in ad-hoc mode, MPs, nodes acting as wireless bridges, or any combination thereof. Additionally, in a preferred embodiment of the present invention, the wireless communication system 100 is a wireless local area network (WLAN). However, the wireless communication system 100 may be any other type of wireless communication system.

Additionally, if the AP 110 and/or the STA 120 include a clear channel assessment (CCA) mode that prevents them from transmitting when jammed, both the AP 110 and the STA 120 may include a configuration for the CCA mode to allow them to transmit when jammed.

Figure 2:
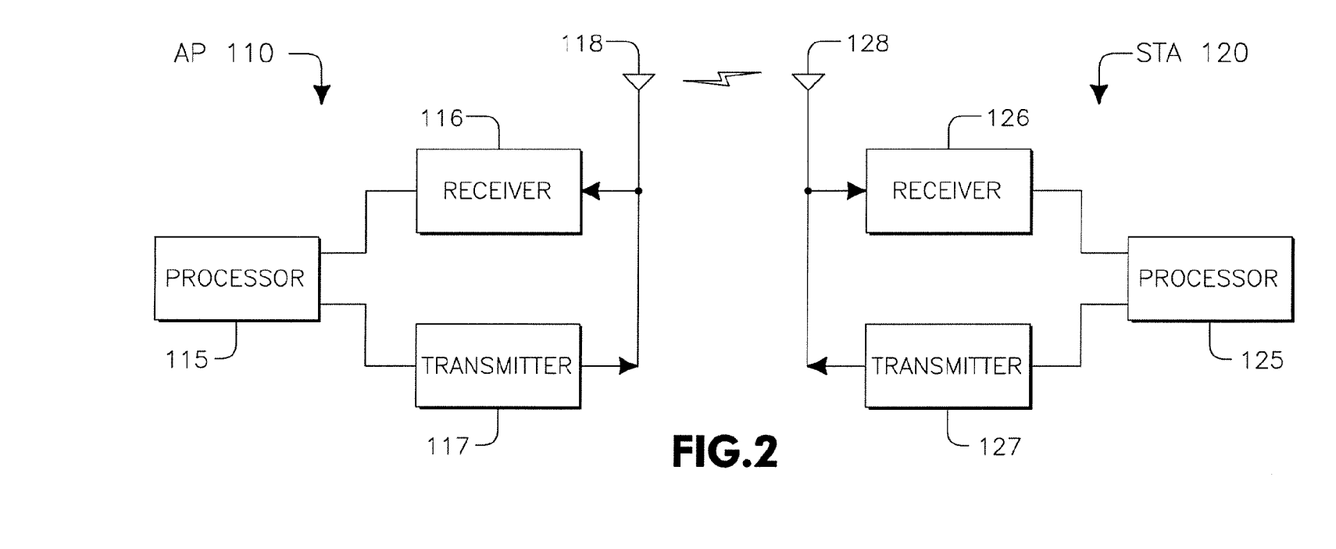
FIG. 2 is a functional block diagram of an AP and a STA of the wireless communication system of FIG. 1.

FIG. 2 is a functional block diagram of an AP 110 and a STA 120 of the wireless communication system 100 of FIG. 1. As shown in FIG. 2, the AP 110 and the STA 120 are in wireless communication with one another, and are configured to implement a BSCC in accordance with the present invention. It should be understood that any type of wireless devices may be used to perform BSCC.

In addition to the components that may be found in a typical AP, the AP 110 includes a processor 115, a receiver 116, a transmitter 117, and an antenna 118. The processor 115 is configured to generate, transmit, and receive BSCC packets in accordance with the present invention. The receiver 116 and the transmitter 117 are in communication with the processor 115. The antenna 118 is in communication with both the receiver 116 and the transmitter 117 to facilitate the transmission and reception of wireless data.

Similarly, in addition to the components that may be found in a typical STA, the STA 120 includes a processor 125, a receiver 126, a transmitter 127, and an antenna 128. The processor 125 is configured to generate, transmit, and receive BSCC packets in accordance with the present invention. The receiver 136 and the transmitter 127 are in communication with the processor 125. The antenna 128 is in communication with both the receiver 126 and the transmitter 127 to facilitate the transmission and reception of wireless data.

Figure 3A:
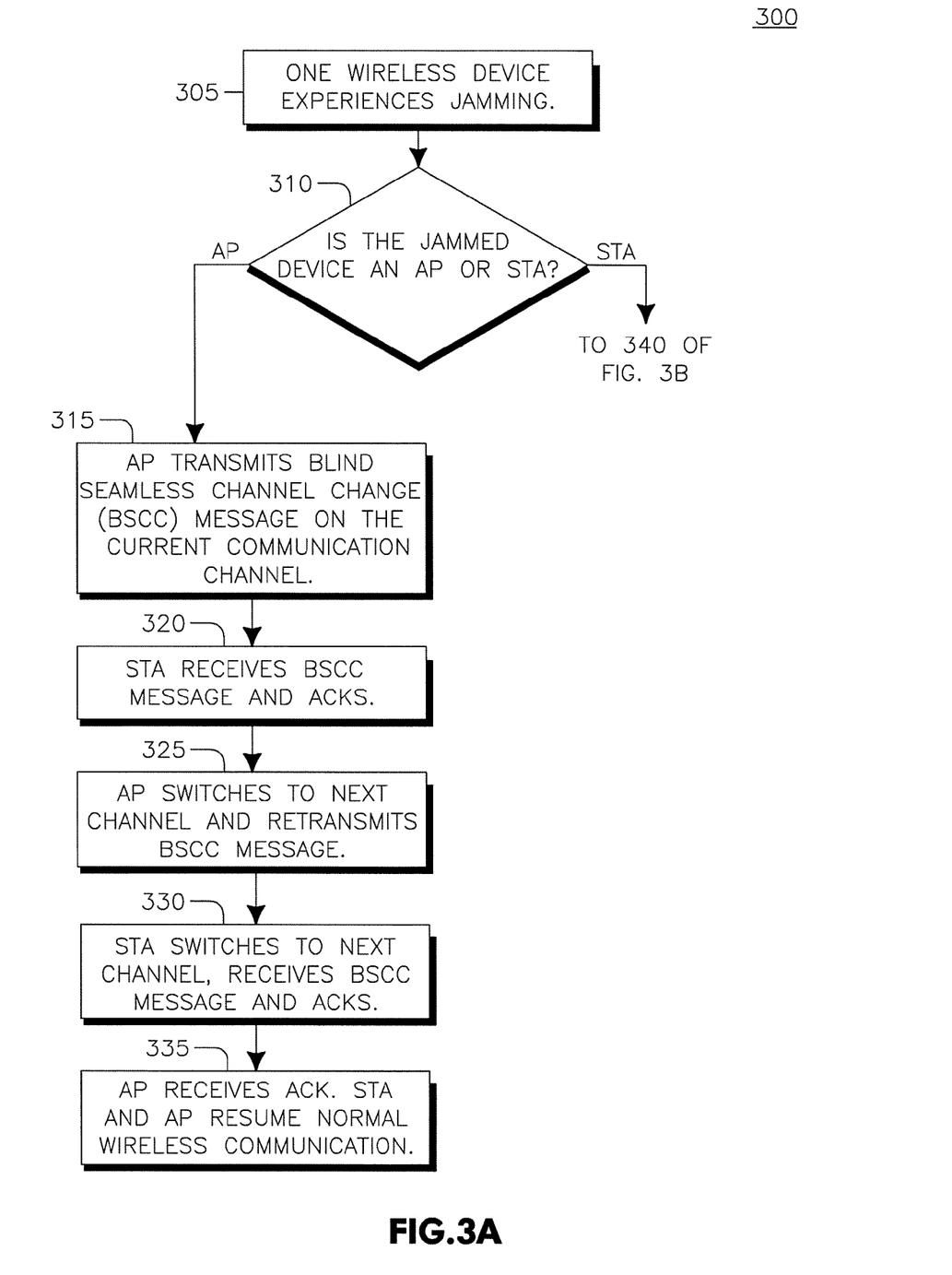
FIGS. 3A and 3B, taken together, are a flow diagram of a method for implementing a blind seamless channel change (BSCC) when one of the devices is jammed, in accordance with the present invention.
Figure 3B:
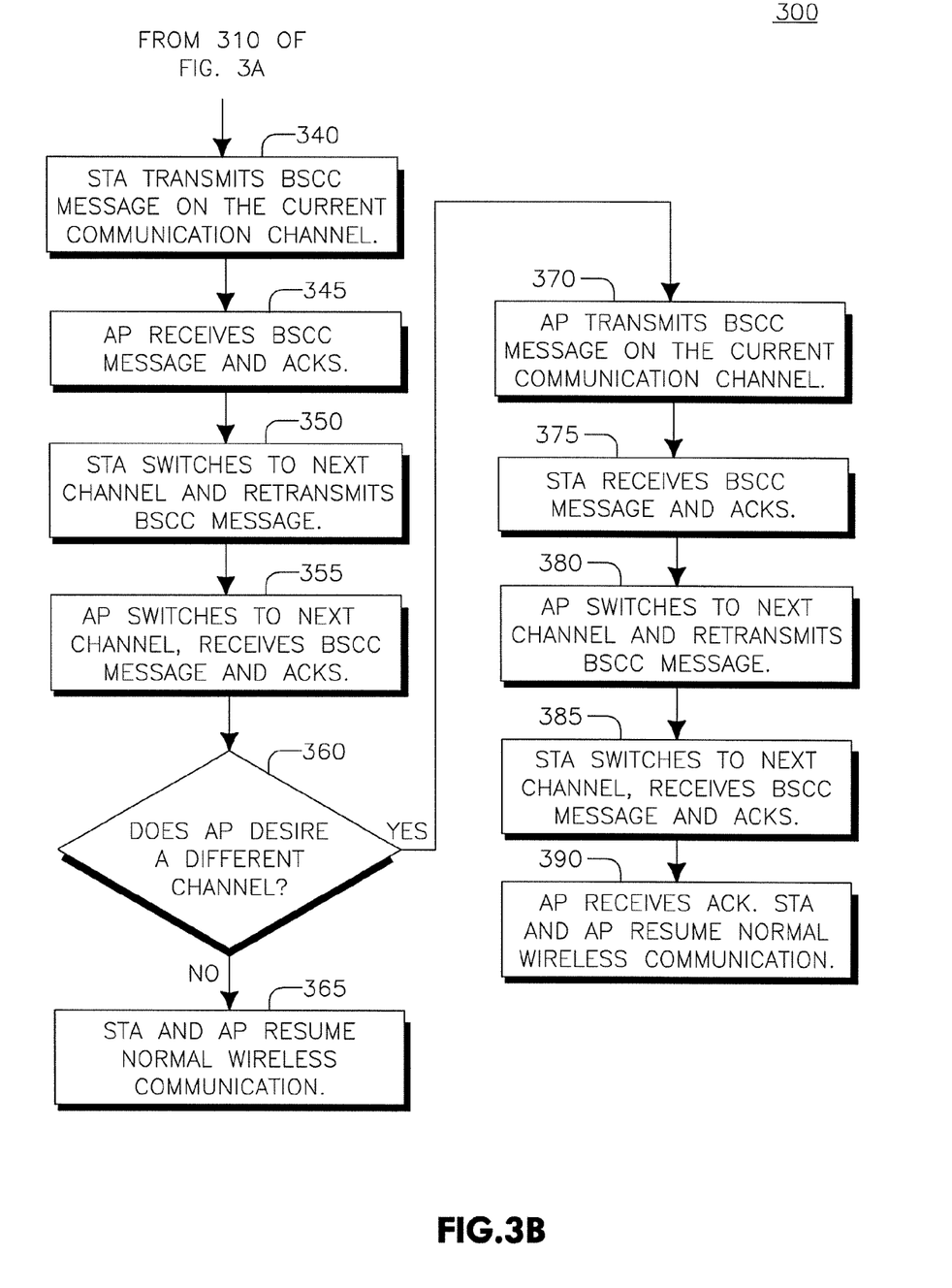

FIGS. 3A and 3B, taken together, are a flow diagram 300 of a method for implementing a BSCC when one of the devices is jammed, in accordance with the present invention. In step 305, one of the wireless communication devices in the wireless communication system 100 experiences interference that disrupts the device's ability to reliably receive packets from one or more counterpart devices. This interference may also be referred to as "jamming." The interference may originate from one or more interfering devices that are outside of the wireless communication system 100 or reside within it. The interference may also be generated by another device generating interference in an unlicensed band used by the wireless communication system 100. Such a device, for example, may be a microwave oven in proximity to one or more of the wireless devices of wireless communication system 100. Depending on whether the AP 110 or the STA 120 is the jammed device (step 310), one of the devices begins implementing a BSCC.

Figure 5:
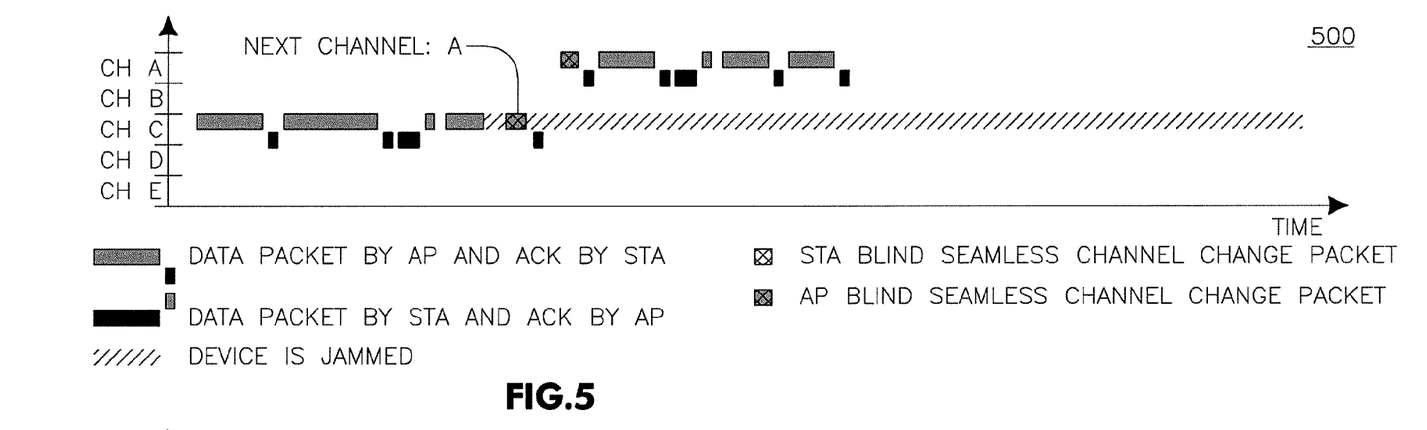
FIG. 5 is a signal exchange diagram depicting a BSCC where an access point is jammed in accordance with the present invention.

FIG. 5 is a signal exchange diagram 500 depicting a BSCC where the AP 110 is jammed, in accordance with the present invention. For purposes of example, there are five (5) available channels depicted for the AP 110 and STA 120 to utilize for communication. The channels are depicted as Channel A (Ch A), Channel B (Ch B), Channel C (Ch C), Channel D (Ch D), and Channel E (Ch E). However, any number of channels may be available for the AP 110 and the STA 120 to communicate with one another. The available, or allowed, transmission channels are pre-defined, in a preferred embodiment of the present invention.

Also, for purposes of example, in FIG. 5 the AP 110 and the STA 120 are currently communicating on channel C (Ch C). It should be noted that the AP 110 and STA 120 could be communicating on any of the channels depicted.

Referring to FIGS. 3A and 5, the AP 110 and the STA 120 are communicating on Channel C with a series of data packets transmitted by the AP 110 and positively acknowledged (ACKed) by the STA 120, and data packets transmitted by the STA 120 and ACKed by the AP 110. If it is determined in step 310 that the AP 110 experiences jamming on Channel C by another wireless device, the AP 110 transmits a BSCC message (i.e. packet) to the STA 120 on Channel C, which is the communication channel on which the AP 110 and the STA 120 are currently communicating (step 315).

The BSCC message includes information relating to the next channel the AP 110 has selected to switch to, and when the AP 110 will commence transmitting on that channel. In one embodiment the time information may be in the form of a time delay depicted in milliseconds (ms). That is to say, the AP 110 may instruct the STA 120 that it will be transmitting on the next channel in a certain number of ms. However, any time information may be utilized to inform the STA 120 when the AP 110 will change to the next channel. In the present example, the next channel that the AP 110 will be switching to is shown as Channel A. The next channel could be any of the available transmission channels, however.

The STA 120 receives the BSCC message from the AP 110 and transmits an ACK to the AP 110 (step 320). Since the AP 110 is currently jammed, it may not receive the ACK from the STA 120. However, whether the AP 110 receives the ACK from the STA 120 or not, the AP 110 switches to the next channel (Ch A) and retransmits the BSCC message (step 325). This retransmitted BSCC message includes timing information indicating that the AP 110 is on the next channel (Ch A) at the current time.

The STA 120 switches to the next channel (Ch A), receives the retransmitted BSCC message on Channel A from the AP 110, and transmits an ACK to the AP 110 (step 330). The AP 110 receives the ACK from the STA 120 and now knows that the STA 120 has changed to the channel indicated in the BSCC message, whereby the AP 110 and the STA 120 resume normal wireless communication with one another (step 335). Alternatively, had the AP 110 not received an ACK from the STA 120 indicating that it had followed the AP 110 to the next channel (Ch A), the AP 110 may employ standard re-transmission procedures to re-transmit the BSCC message to the STA 120.

Figure 6:
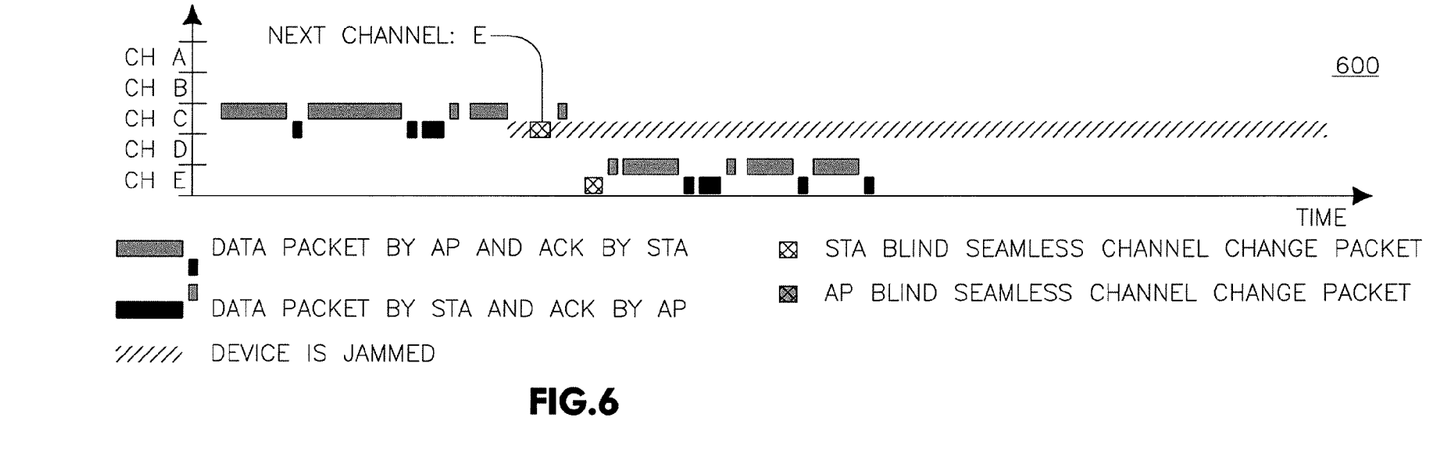
FIG. 6 is a signal exchange diagram depicting a BSCC where a station is jammed in accordance with the present invention.

FIG. 6 is a signal exchange diagram 600 depicting a BSCC where the STA 120 is jammed, in accordance with the present invention. Again, for purposes of example, there are five (5) available channels depicted for the AP 110 and STA 120 to utilize for communication. The channels are depicted as Channel A (Ch A), Channel B (Ch B), Channel C (Ch C), Channel D (Ch D), and Channel E (Ch E).

Referring now to FIGS. 3A, 3B and 6, the AP 110 and the STA 120 are communicating on Channel C with a series of data packets transmitted by the AP 110 and acknowledged (ACKed) by the STA 120, and data packets transmitted by the STA 120 and ACKed by the AP 110. If it is determined in step 310 that the STA 120 experiences jamming on Channel C by another wireless device, the STA 120 transmits a BSCC message to the AP 110 on Channel C, which is the communication channel on which the AP 110 and the STA 120 are currently communicating (step 340).

The BSCC message includes information relating to the next channel the STA 120 has selected to switch to, and when the STA 120 will commence transmitting on that channel. In this example, the STA 120 will be switching to Channel E (Ch E) next. In essence, the BSCC message transmitted by the STA 120 is substantially similar to the BSCC message transmitted by the AP 110 in that it contains substantially similar data regarding a next channel the device will be changing to as well as timing information related to when the device will begin transmitting on that next channel.

The AP 110 receives the BSCC message from the STA 120 and transmits an ACK to the STA 120 (step 345). Since the STA 120 is currently jammed, it may not receive the ACK from the AP 110. Nevertheless, whether the STA 120 receives the ACK from the AP 110 or not, the STA 120 switches to the next channel (Ch E) and retransmits the BSCC message (step 350). This retransmitted BSCC message includes timing information indicating that the STA 120 is on the next channel (Ch E) at the current time.

The AP 110 switches to the next channel (Ch E), receives the retransmitted BSCC message on Channel E from the STA 120, and transmits and ACK to the STA 120 (step 355). At this point, it may be desirable for the AP 110 to determine whether or not communication should continue on the new channel or be switched to another channel. For example, the AP 110 may know that there is significant interference on Channel E that would make it difficult to continue wireless communication on that channel, or the AP 110 may have had several other STAs 120 switch to Channel A after they were jammed. In these cases, the AP 110 may find it desirable to transfer communication with a particular STA 120 to a different channel (step 360).

If the AP 110 does not desire to change to a different channel from the one the STA 120 switched to, or if the wireless communication system 100 does not include a provision for the AP 110 to make a choice, then the STA 120 and the AP 110 resume normal wireless communication on the new channel (step 365). In the present example as shown in FIG. 6, the STA 120 and the AP 110 resume normal wireless communication on Channel E.

Figure 7:
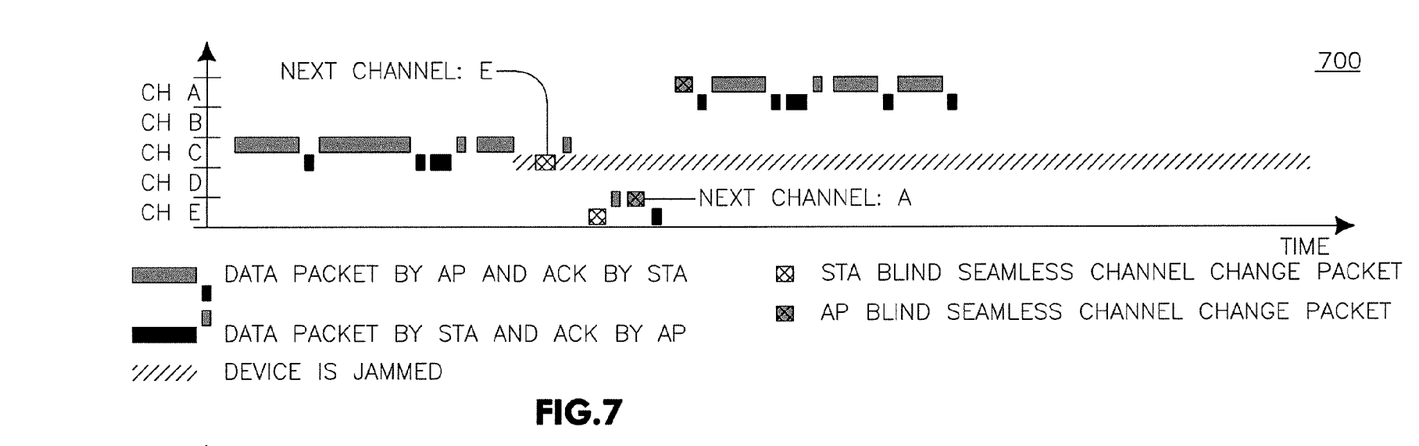
FIG. 7 is a signal exchange diagram depicting an alternative BSCC in accordance with the present invention.

However, as an alternative, if the AP 110 does desire a different channel (step 360), it may indicate such to the STA 120. FIG. 7 is a signal exchange diagram 700 depicting an alternative BSCC in accordance with the present invention where the AP 110 desires to change from the channel that the STA 120 selects after the STA 120 experiences jamming.

Accordingly, referring to FIGS. 3A, 3B, and 7, if the AP 110 desires to change from the channel selected by the STA 120 (step 360), then the AP 110 transmits a BSCC message to the STA 120 on the current communication channel (step 370). In the present example, the current communication channel is Channel E, which is the channel that the STA 120 selected to switch to after experiencing jamming on Channel C.

The BSCC message includes information relating to the next channel the AP 110 desires to switch to and when the AP 110 will commence transmitting on that channel. In the present example shown in FIG. 7, the next channel the AP 110 desires to switch to is Channel A.

The STA 120 receives the BSCC from the AP 110 and transmits an ACK to the AP 110 (step 375). In this scenario, the AP 110 has a fairly high probability of receiving the ACK from the STA 120, since Channel E is not jammed. The AP 110 switches to the next channel (Ch A) and retransmits the BSCC message (step 380). This retransmitted BSCC message includes timing information indicating that the AP 110 is on the next channel (Ch A) at the current time.

The STA 120 switches to the next channel (Ch A), receives the retransmitted BSCC message on Channel A from the AP 110, and transmits and ACK to the AP 110 (step 385). The AP 110 receives the ACK from the STA 120 and now knows that the STA 120 has changed to the channel indicated in the BSCC, whereby the AP 110 and the STA 120 resume normal wireless communication with one another (step 390).

Figure 4A:
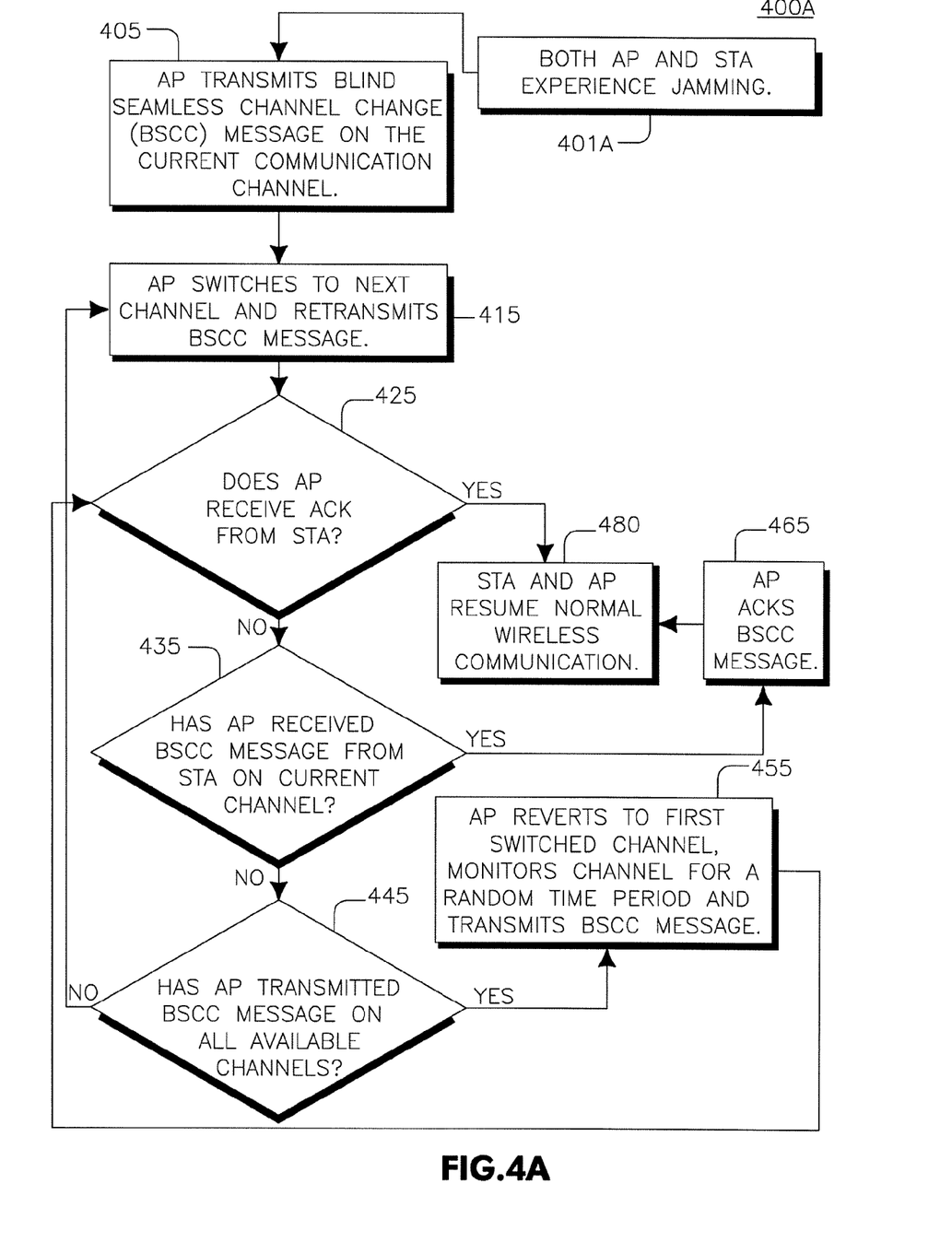
FIGS. 4A and 4B, taken together, are a flow diagram of a method for implementing a BSCC when two communication devices are jammed, in accordance with the present invention.
Figure 4B:
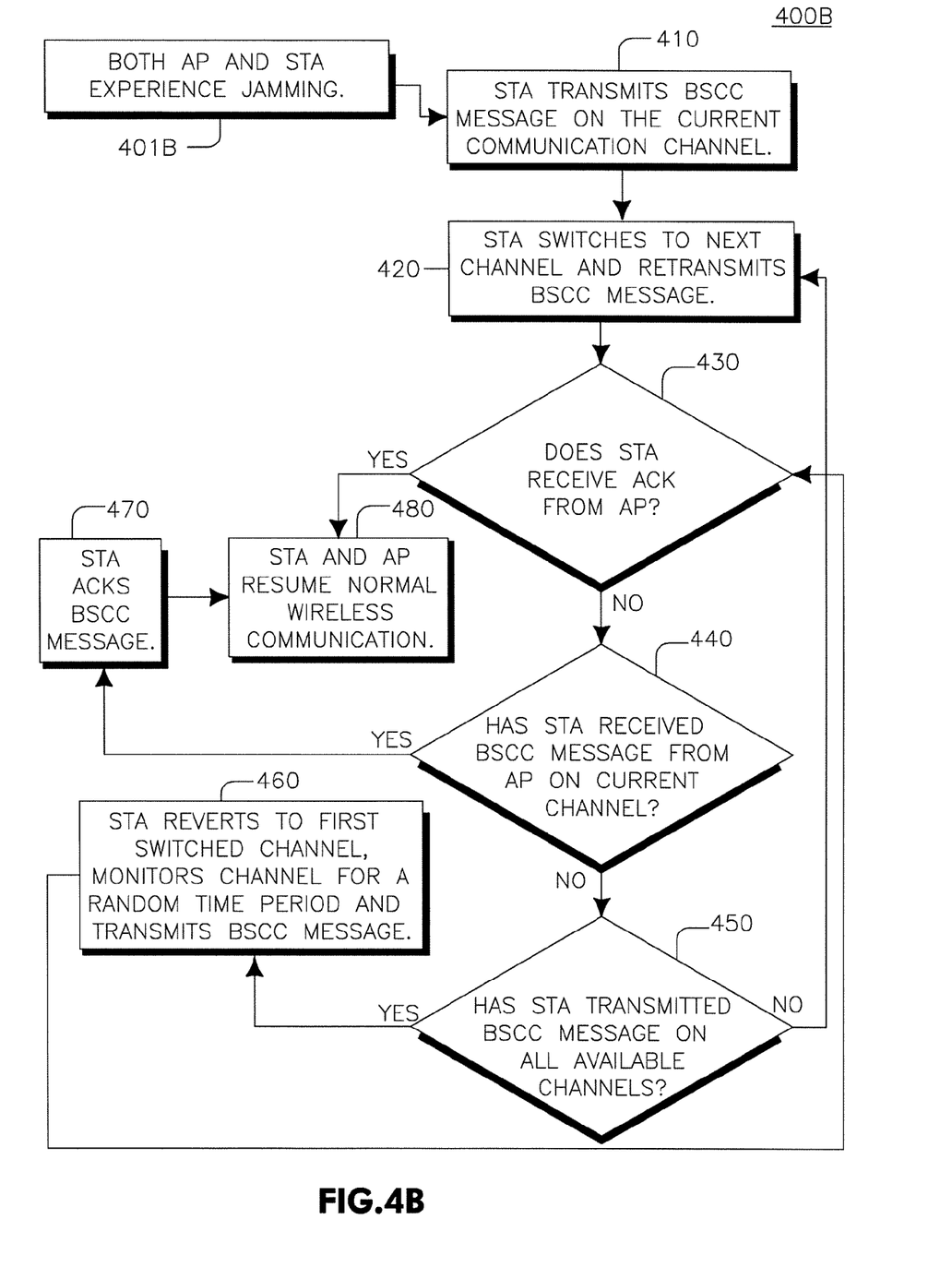
Figure 8:
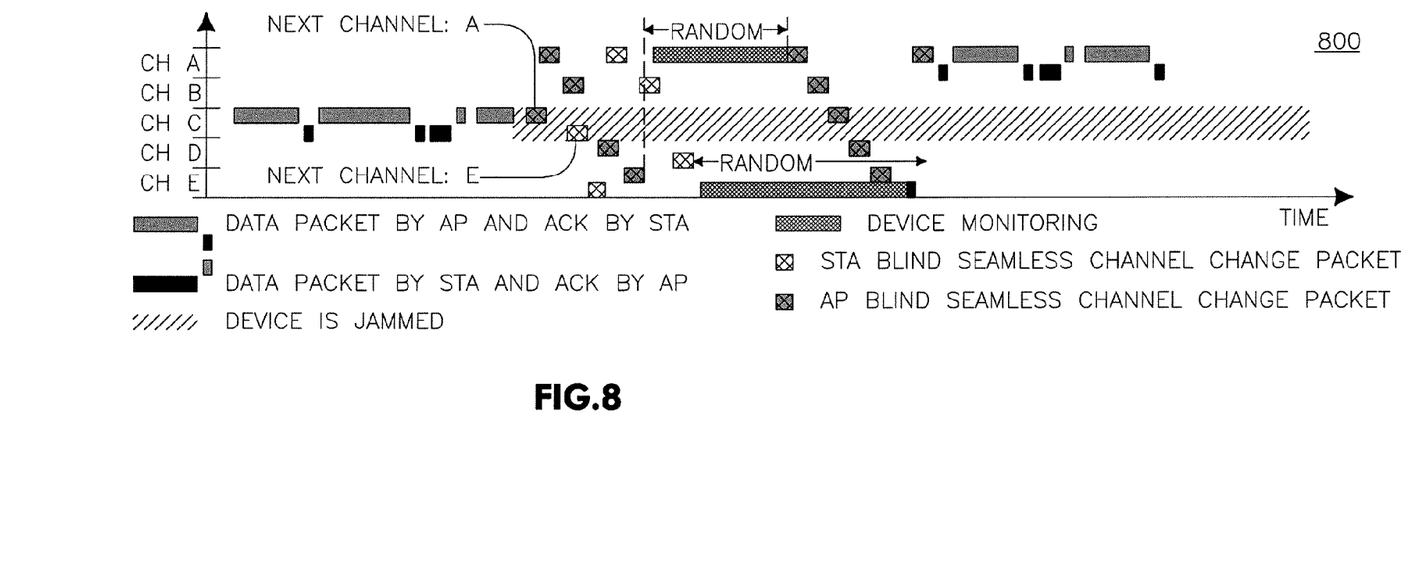
FIG. 8 is a signal exchange diagram depicting a BSCC where both an AP and a STA are jammed in accordance with the present invention.

In an alternative scenario, it is also possible that both wireless devices may experience jamming. FIGS. 4A and 4B, taken together, are a flow diagram 400, designated 400A in FIGS. 4A and 400B in FIG. 4B, of a method for implementing a BSCC when two communication devices are jammed, in accordance with the present invention. Similarly, FIG. 8 is a signal exchange diagram depicting the BSCC where both the AP 110 and the STA 120 are jammed. Again, for purposes of example, there are five (5) available channels depicted for the AP 110 and STA 120 to utilize for communication. The channels are depicted as Channel A (Ch A), Channel B (Ch B), Channel C (Ch C), Channel D (Ch D), and Channel E (Ch E).

Referring now to FIGS. 4A, 4B, and 8, the AP 110 and the STA 120 are communicating on Channel C with a series of data packets transmitted by the AP 110 and acknowledged (ACKed) by the STA 120, and data packets transmitted by the STA 120 and ACKed by the AP 110. In step 401, designated 401A in FIGS. 4A and 401B in FIG. 4B, both the AP 110 and the STA 120 experience jamming on Channel C.

The AP 110 then transmits a BSCC message to the STA 120 on Channel C, which is the communication channel on which the AP 110 and the STA 120 are currently communicating (step 405). The BSCC message includes information relating to the next channel the AP 110 has selected to switch to and when the AP 110 will commence transmitting on that channel. In the present example, the next channel that the AP 110 will be switching to is shown as Channel A.

Likewise, the STA 120 transmits a BSCC message to the AP 110 on Channel C, which is the communication channel on which the AP 110 and the STA 120 are currently communicating (step 410). The BSCC message from the STA 120 includes information relating to the next channel the STA 120 has selected to switch to and when the STA 120 will commence transmitting on that channel. In this example, the STA 120 will be switching to Channel E (Ch E) next.

Since both the AP 110 and the STA 120 are experiencing jamming, neither one receives the BSCC message from the other. Accordingly, neither one ACKs the BSCC message.

The AP 110 then switches to the next channel (Ch A) and retransmits the BSCC (step 415). This retransmitted BSCC message includes timing information indicating that the AP 110 is on the next channel (Ch A) at the current time. Similarly, the STA 120 switches to the next channel (Ch E) and retransmits its BSCC (step 420). The STA 120 retransmitted BSCC message includes timing information indicating that the STA 120 is on the next channel (Ch E) at the current time.

If the AP 110 were to receive an ACK from the STA 120 (step 425), or the STA 120 were to receive an ACK from the AP 110 (step 430), then the STA 120 and the AP 110 would resume normal wireless communication with one another (step 480). In this case, either the AP 110 or the STA 120 would have followed its counterpart to the same next channel.

Also, if after switching to the next channel, the AP 110 receives a BSCC message from the station on the now current channel (step 435), then the AP 110 ACKs the BSCC (step 465) and the STA 120 and AP 110 resume normal wireless communication with one another (step 480). Likewise, if the STA 120, after switching to the next channel, receives a BSCC message from the AP 110 on the now current channel (step 440), then the STA 120 ACKs the BSCC message (step 470) and the STA 120 and AP 110 resume normal wireless communication with one another (step 480).

In the present example of FIG. 8, however, the AP 110 has switched to Channel A after jamming, while the STA 120 has switched to Channel E. Therefore, the AP 110 does not receive either an ACK from the STA 120 (step 425) or a BSCC message from the STA 120 (step 435) on Channel A. Likewise, the STA 120 does not receive either an ACK from the AP 110 (step 430) or a BSCC message from the AP 110 (step 440) on Channel E.

If other channels are available, and the AP 110 has not transmitted a BSCC message on all available channels (step 445), then the AP 110 switches to the next available channel and repeats steps 415 through 445 until the AP 110 has transmitted a BSCC message on all available channels, or until the AP 110 has received an ACK from the STA 120 on one of the available channels (step 425) or a BSCC message from the STA 120 on one of the available channels (step 435). For example, as shown in FIG. 8, the AP 110 cycles through Channel B, Channel D, and Channel E, transmitting a BSCC on each channel. However, this is only one example. The determination of the sequence of channels that the AP 110 cycles through may be based on measurements the AP 110 performs on each channel or may be collected from other nodes. Additionally, the sequence does not necessarily need to be pre-agreed to by the AP 110 and any counterpart STA 120 prior to the jamming event.

In like manner, if other channels are available, and the STA 120 has not transmitted a BSCC message on all available channels (step 450), then the STA 120 switches to the next available channel and repeats steps 420 through 450 until the STA 120 has transmitted a BSCC message on all available channels, or until the STA 120 has received an ACK from the AP 110 on one of the available channels (step 430) or a BSCC message from the AP 120 on one of the available channels (step 440). For example, as shown in FIG. 8, the STA 120 cycles through Channel A, Channel B, and Channel D, transmitting a BSCC message on each channel. Similarly to the sequence of channels cycled through by the AP 110, the determination of the sequence of channels that the STA 120 cycles through may be based on measurements the STA 120 performs on each channel or may be collected from other nodes. Additionally, the sequence does not necessarily need to be pre-agreed to by the AP 110 and any counterpart STA 120 prior to the jamming event.

Once the AP 110 has transmitted a BSCC message on all available channels (step 445), it then reverts to the first available channel that it switched to (Channel A in the current example), monitors the channel for a random period of time, and then transmits a BSCC message on that channel (step 455). The random time period should be such that, on average, it is significantly greater than the total time period it is estimated that it will take to cycle through the sequence of transmitting BSCC messages on all available channels to increase the probability of receiving a BSCC message from the STA 120. The estimated time it will take to cycle through the sequence of transmitting BSCC message on all available channels depends on the number of available channels, the transmission rate used to transmit the BSCC message, the size of the BSCC message and the number of transmission BSCC message attempts AP 110 on each channel if it does not receive an ACK. For example, in one embodiment the random time period is generated according to a uniform distribution between 5 and 20 ms, although the AP 110 is not limited to using a uniform distribution. However, the AP 110 may use alternative statistical distributions to create randomness in the active and passive monitoring phases of the devices. The AP 110 then recycles through all available channels transmitting BSCC messages on each, repeating steps 415 through 445 as necessary.

Once the STA 120 has transmitted a BSCC message on all available channels (step 450), it then reverts to the first available channel that it switched to (Channel E in the current example), monitors the channel for a random period of time, and transmits a BSCC message on that channel (step 460). The random time period should be such that, on average, it is significantly greater than the total time period it is estimated that it will take to cycle through the sequence of transmitting BSCC messages on all available channels to increase the probability of receiving a BSCC message from the AP 110. The estimated time it will take to cycle through the sequence of transmitting BSCC messages on all available channels depends on the number of available channels, the transmission rate used to transmit the BSCC messages, the size of the BSCC messages and the number of transmission BSCC message attempts STA 120 on each channel if it does not receive an ACK. For example, in one embodiment the random time period is generated according to a uniform distribution between 5 and 20 ms, although the STA 120 is not limited to using a uniform distribution. However, the STA 120 may use alternative statistical distributions to create randomness in the active and passive monitoring phases of the devices. The STA 120 then recycles through all available channels transmitting BSCC messages on each, repeating steps 420 through 450 as necessary.

In a preferred embodiment of the present invention, the random time period may be a random time period that is generated by the AP 110 and STA 120 themselves. Also in a preferred embodiment, the time period should be such that, on average, it is greater than the total time period it estimated that it will take to cycle through the sequence of transmitting BSCC messages on all available channels. Furthermore, in a preferred embodiment, the random time period may be performed according to a uniform distribution method between two integers.

In the example shown in FIG. 8, the AP 110 completes a first sequence of BSCC messages and reverts to Channel A, where it waits a random time period before beginning the sequence again. STA 120 completes a first sequence of BSCC messages and reverts to Channel E, where it waits a random time period before beginning its BSCC message sequence again. While waiting on Channel E, the STA 120 receives the BSCC message from the AP 110 on its second sequence transmitting BSCC messages on each available channel. The BSCC message indicates to the STA 120 that the AP 110 is going to return to Channel A at a certain time period. The STA 120 ACKs the BSCC message from the AP 110.

The AP 110 and the STA 120 switch to Channel A, where the AP 110 retransmits the BSCC message indicating that it is currently on Channel A. The STA 120 receives the retransmitted BSCC message, ACKs the BSCC message, and the AP 110 and the STA 120 resume normal wireless communication on Channel A.

The present invention may be implemented in any type of wireless communication system, as desired. Additionally, the features of the present invention may implemented by software, may be incorporated into an integrated circuit (IC) or be configured in a circuit comprising a multitude of interconnecting components. Additionally, the processors 115/125 of the AP 110 and STA 120, respectively, may be configured to perform the steps of the methods 300 and 400 described above. The processors 115/125 may also utilize the receivers 116/126, transmitters 117/127, and antennas 118/128, respectively, to facilitate wirelessly receiving and transmitting data.

Although the features and elements of the present invention are described in the preferred embodiments in particular combinations, each feature or element can be used alone (without the other features and elements of the preferred embodiments) or in various combinations with or without other features and elements of the present invention. For example, although only one BSCC message is described as being transmitted on each channel, either the AP 110 or the STA 120 may transmit a redundant BSCC message on the channel before switching to the next channel. In this way, the AP 110 and STA 120 may be able to avoid frame collisions or frame errors that would prevent one or both devices from receiving the other's BSCC message.

What is claimed is:

1. A method for implementing a blind seamless channel change (BSCC) between a first communication device and a second communication device in a wireless communication when the first wireless communication device is jammed on a current communication channel, the method comprising:
    transmitting a BSCC message on the current communication channel to the second wireless communication device, wherein the BSCC message includes information relating to a first selected channel of a plurality of available communication channels the first wireless communication device is switching to and a time period when the first wireless communication device will be transmitting on the first selected communication channel;
    switching to the first selected communication channel by the first wireless communication device;
    retransmitting the BSCC message to the second wireless communication device on the first selected communication channel; and
    resuming normal wireless communication with the second wireless communication device;
    performing a BSCC sequence on each available communication channel on a condition that no acknowledgment is received to the retransmitted BSCC on the first selected communication channel, wherein the BSCC sequence comprises transmitting an additional BSCC message on each of the next available communication channels until the first wireless communication device has transmitted a BSCC message on all available communication channels, and wherein the BSCC message transmitted on each available communication channel includes information relating to the next channel of the plurality of available communication channels the first wireless communication device is switching to and the time period when the first wireless communication device will be transmitting on the first wireless communication device's next selected communication channel;
    reverting to the first selected communication channel on a condition that the BSCC sequence has been performed on all available communication channels;
    monitoring the first selected communication channel for a random time period;
    repeating the BSCC sequence until receiving an acknowledgment (ACK) from the second wireless communication device on at least one of the available communication channels; and
    resuming normal wireless communication with the second wireless communication device on at least one available communication channel.

2. The method of claim 1, further comprising the second wireless communication device transmitting an acknowledgement (ACK) message upon receiving the BSCC message from the first wireless communication device.

3. The method of claim 1, further comprising the second wireless communication device transmitting an ACK message upon receiving the retransmitted BSCC from the first wireless communication device.

4. The method of claim 1 wherein the first and second wireless communication devices resume normal wireless communication on the first selected communication channel.

5. The method of claim 1 wherein the first wireless communication device is an access point (AP) and the second wireless communication device is a station (STA).

6. The method of claim 1 wherein the first wireless communication device is a STA and the second wireless communication device is an AP.

7. The method of claim 6, further comprising: receiving an additional BSCC message on the first selected communication channel, wherein the additional BSCC message includes
    information relating to a second selected communication channel of the plurality of available communication channels the AP is switching to next and a time period when the AP will be transmitting on the second selected communication channel;
    receiving the additional BSCC message and switching to the second selected communication channel by the STA; and
    resuming normal wireless communication over the second selected communication channel by the AP and the STA.

8. The method of claim 7, further comprising the STA transmitting an ACK upon receiving the additional BSCC from the AP.

9. The method of claim 7, further comprising the STA receiving an additional BSCC message retransmitted on the second selected communication channel.

10. The method of claim 9, further comprising the STA transmitting an ACK upon receiving the retransmitted additional BSCC message from the AP on the second selected communication channel.

11. The method of claim 1, further comprising the first wireless communication device determining the existence of a clear channel assessment (CCA) mode within the first wireless communication device, and configuring the CCA mode to allow transmission during jamming.

12. The method of claim 1, further comprising the first wireless communication device transmitting a redundant BSCC message on the current communication channel after receiving no ACK from the second wireless communication device.

13. A method for implementing a blind seamless channel change (BSCC) in a wireless communication when at least two wireless communication devices are jammed on a current communication channel, the method comprising:

transmitting a first BSCC message on the current communication channel from a first communication device to a second wireless communication device, wherein the first BSCC message includes information relating to a first selected communication channel of a plurality of available communication channels the first wireless communication device is switching to next and a time period when the first wireless communication device will be transmitting on the first selected communication channel;

switching to the first selected communication channel and retransmitting the first BSCC message on the first selected communication channel;

performing a BSCC sequence on each available communication channel on a condition that no acknowledgment is received to the retransmitted BSCC on the first selected communication channel, wherein the BSCC sequence comprises transmitting an additional BSCC message on each of the next available communication channels until the first wireless communication device has transmitted a BSCC message on all available communication channels, and wherein the BSCC message transmitted on each available communication channel includes information relating to the next channel of the plurality of available communication channels the first wireless communication device is switching to and the time period when the first wireless communication device will be transmitting on the first wireless communication device's next selected communication channel;

reverting to the first selected communication channel on a condition that the BSCC sequence has been performed on all available communication channels;

monitoring the first selected communication channel for a random time period;

repeating the BSCC sequence until receiving an acknowledgment (ACK) from the second wireless communication device on at least one of the available communication channels; and resuming normal wireless communication with the second wireless communication device on at least one available communication channel.

14. The method of claim 13, further comprising the second wireless communication device:

transmitting a first BSCC message on the current communication channel to the first wireless communication device, wherein the first BSCC message of the second wireless communication device includes information relating to a first selected channel of the plurality of available communication channels the second wireless communication device is switching to next and a time period when the second wireless communication device will be transmitting on the second wireless communication device's first selected communication channel;

switching to the first selected communication channel and retransmitting the first BSCC on the first selected communication channel;

performing a BSCC sequence on each available communication channel on a condition that no acknowledgment is received to the retransmitted BSCC on the first selected communication channel;

reverting to the first selected communication channel if the BSCC sequence has been performed on all available communication channels;

monitoring the first selected communication channel for a random time period; and repeating the BSCC sequence until receiving an acknowledgment (ACK) from the first wireless communication device on at least one of the available communication channels.

15. An access point (AP) configured to implement a blind seamless channel change (BSCC) in a wireless communication, comprising:

a receiver;

a transmitter; and a processor in communication with the receiver and the transmitter, wherein the processor is configured to detect interference on a current communication channel, transmit a BSCC message on the current communication channel, switch to a next selected communication channel of a plurality of available communication channels, retransmit the BSCC message on the next selected communication channel, and resume normal wireless communication on the next selected communication channel;

performing a BSCC sequence on each available communication channel on a condition that no acknowledgment is received to the retransmitted BSCC on the first selected communication channel, wherein the BSCC sequence comprises transmitting an additional BSCC message on each of the next available communication channels until the first wireless communication device has transmitted a BSCC message on all available communication channels, and wherein the BSCC message transmitted on each available communication channel includes information relating to the next channel of the plurality of available communication channels the first wireless communication device is switching to and the time period when the first wireless communication device will be transmitting on the first wireless communication device's next selected communication channel;

reverting to the first selected communication channel on a condition that the BSCC sequence has been performed on all available communication channels;

monitoring the first selected communication channel for a random time period;

repeating the BSCC sequence until receiving an acknowledgment (ACK) from the second wireless communication device on at least one of the available communication channels; and resuming normal wireless communication with the second wireless communication device on at least one available communication channel.

16. The AP of claim 15 wherein the processor is further configured to receive an acknowledgement.

17. The AP of claim 15 wherein the processor is further configured to receive a BSCC, wherein the BSCC message indicates a next channel to switch to, determine an undesirability of the next communication channel to switch to, switch to the next communication channel, and transmit a BSCC message indicating a next communication channel to switch to for resuming normal wireless communication.

18. The AP of claim 15 wherein the processor is further configured to perform a BSCC sequence on each of an available communication channel, wherein the BSCC sequence includes transmitting an additional BSCC message on each of the next available communication channels until the AP has transmitted a BSCC message on all available communication channels, and wherein the BSCC message transmitted on each available communication channel includes information relating to the next channel of the plurality of available communication channels the AP is switching to and the time period when the AP will be transmitting on the AP's next communication channel.

19. The AP of claim 18 wherein the processor is further configured to revert to a first selected communication channel, monitor the first selected communication channel for a random time period, and repeat the BSCC sequence until receiving an ACK on at least one of the available communication channels.

20. A station (STA) configured to implement a blind seamless channel change (BSCC) in a wireless communication, comprising:

a receiver;
a transmitter; and a processor in communication with the receiver and the transmitter, wherein the processor is configured to detect interference on a current communication channel, transmit a BSCC message on the current communication channel, switch to a next selected communication channel of a plurality of available communication channels, retransmit the BSCC message on the next selected communication channel, and resume normal wireless communication on the next selected communication channel;
performing a BSCC sequence on each available communication channel on a condition that no acknowledgment is received to the retransmitted BSCC on the first selected communication channel, wherein the BSCC sequence comprises transmitting an additional BSCC message on each of the next available communication channels until the first wireless communication device has transmitted a BSCC message on all available communication channels, and wherein the BSCC message transmitted on each available communication channel includes information relating to the next channel of the plurality of available communication channels the first wireless communication device is switching to and the time period when the first wireless communication device will be transmitting on the first wireless communication device's next selected communication channel;
reverting to the first selected communication channel on a condition that the BSCC sequence has been performed on all available communication channels;
monitoring the first selected communication channel for a random time period;
repeating the BSCC sequence until receiving an acknowledgment (ACK) from the second wireless communication device on at least one of the available communication channels; and
resuming normal wireless communication with the second wireless communication device on at least one available communication channel.

21. The STA of claim 20 wherein the processor is further configured to receive an acknowledgement.

22. The STA of claim 20 wherein the processor is further configured to receive a BSCC message, wherein the BSCC message indicates a next channel to switch to, determine an undesirability of the next communication channel, switch to the next communication channel, and transmit a BSCC indicating a next communication channel to switch to for resuming normal wireless communication.

23. The STA of claim 20 wherein the processor is further configured to perform a BSCC sequence on each of an available communication channel, wherein the BSCC sequence includes transmitting an additional BSCC message on each of the next available communication channels until the STA has transmitted a BSCC message on all available communication channels, and wherein the BSCC message transmitted on each available communication channel includes information relating to the next channel of the plurality of available communication channels the STA is switching to and the time period when the STA will be transmitting on the STA's next communication channel.

24. The STA of claim 23 wherein the processor is further configured to revert to a first next communication channel, monitor the first next communication channel for a random time period, and repeat the BSCC sequence until receiving an ACK on at least one of the available communication channels.

* * * * *